United States Patent [19]

Herbert

[11] Patent Number: 4,561,110

[45] Date of Patent: Dec. 24, 1985

[54] BAG FOR THE STORAGE OF LIQUIDS

[75] Inventor: Reinhold Herbert, Neu-Anspach, Fed. Rep. of Germany

[73] Assignee: Fresenius AG, Neu-Anspach, Fed. Rep. of Germany

[21] Appl. No.: 455,868

[22] Filed: Jan. 5, 1983

[30] Foreign Application Priority Data

Jan. 7, 1982 [DE] Fed. Rep. of Germany ....... 3200263

[51] Int. Cl.⁴ .............................................. A61M 5/14
[52] U.S. Cl. ................................................... 604/408; 604/415
[58] Field of Search ............... 604/403, 408, 415, 410; 383/94, 100; 206/526; 428/520

[56] References Cited

U.S. PATENT DOCUMENTS

| | | | |
|---|---|---|---|
| 3,925,591 | 12/1975 | Breitenfellner et al. | 428/520 |
| 3,932,693 | 1/1976 | Shaw et al. | 428/520 |
| 3,942,529 | 3/1976 | Waage | 206/526 |
| 3,950,605 | 4/1976 | Hori et al. | 428/520 |
| 3,986,507 | 10/1976 | Watt | 604/408 |
| 4,044,187 | 8/1977 | Kremkau | 428/520 |
| 4,112,989 | 9/1978 | Grode et al. | 383/100 |
| 4,127,688 | 11/1978 | Bieler et al. | 428/520 |
| 4,131,200 | 12/1978 | Rinfret | 383/94 |
| 4,183,434 | 1/1980 | Watt | 604/408 |
| 4,191,231 | 3/1980 | Winchell et al. | 604/408 |
| 4,410,026 | 10/1983 | Boggs et al. | 604/408 |
| 4,453,940 | 6/1984 | Aoyagi et al. | 604/408 |
| 4,516,977 | 5/1985 | Herbert | 604/415 |

OTHER PUBLICATIONS

Van Nostrand Reinhold Encyclopedia of Chemistry, Van Nostrand Reinhold, N.Y., 1984, pp. 364–365.

Primary Examiner—Stephen Marcus
Assistant Examiner—David Voorhees
Attorney, Agent, or Firm—Omri M. Behr

[57] ABSTRACT

A bag for storing liquids for medical purposes such as blood and liquids for parenteral administration and which has neutral physiological properties is made of polyolefin material that is more specially in the form of a polyethylene film for the body of the bag and a copolymer of ethylene and vinyl acetate, with more specially 20 to 32% by weight of vinyl acetate, as a material for the hose connector. The copolymer is welded to the material of the body of the bag and then cross linked.

20 Claims, 7 Drawing Figures

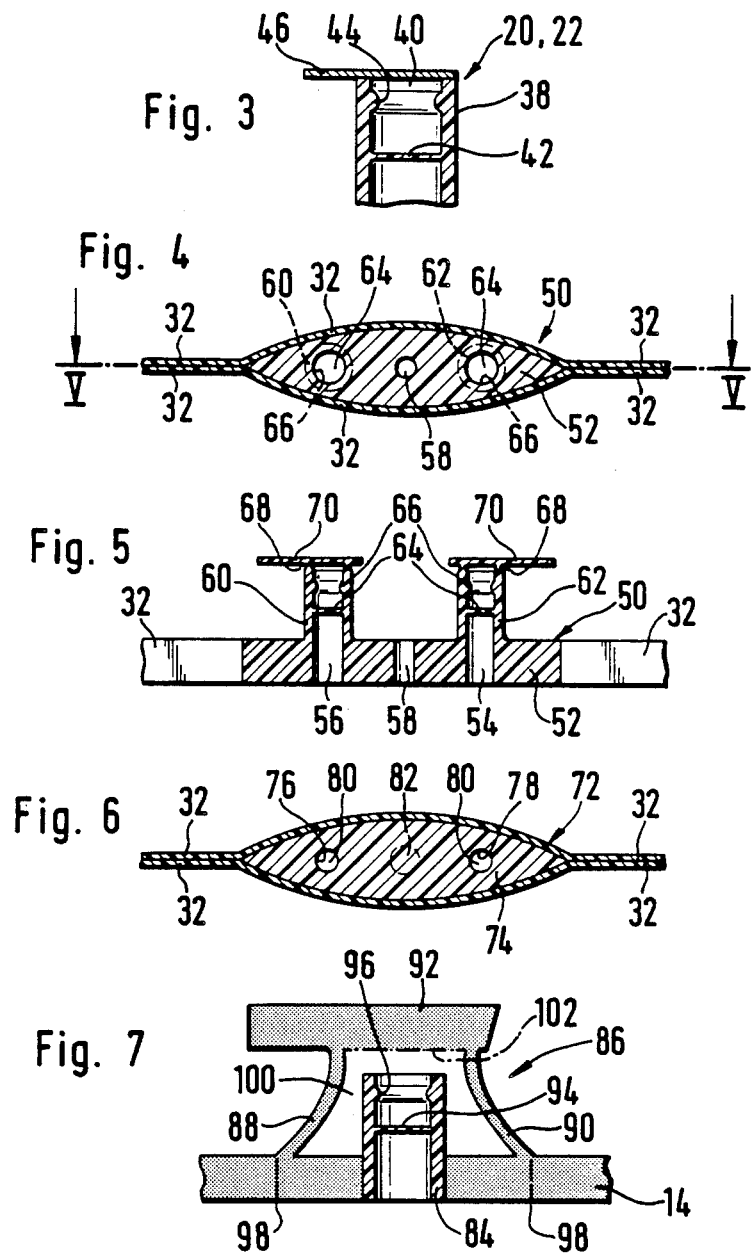

BAG FOR THE STORAGE OF LIQUIDS

BACKGROUND OF THE INVENTION

The present invention is with respect to storage bags and more specially to such bags for medical purposes for the storing of blood or infusion solutions and made up of a thermoplastic polymeric material with at least one hose-like outlet.

Bags of this sort are used on a very large scale for medical purposes so that the overall number of bags used is of the order of millions. The bags are needed for example for taking up blood as a blood storage bag or for the sterile storage of solutions for parenteral injection solutions. For this purpose the bags have to be completely sterile and to this end normally have to be heated to at least 100 degrees C. or more specially about 120 degrees C. Even for this purpose the thermoplastic polymeric material has to have such properties that it is thermally stable, at least up to the temperature to which it is heated for sterilization.

Further properties desired of such bags are that they be light in weight, low in price and able to be produced automatically, while furthermore their value after use is to be so low that they may in good conscience be thrown away. Moreover the material of the bag is to be flexible, able to be folded and, in the processed condition so glass-clear that it is possible to see at once if there have been any undesired changes in the liquid stored in the bag.

The only polymer that so far has kept to this specification of desired properties is flexible vinyl, that is to say plasticized polyvinyl chloride (PVC) or polyvinyl chloride with the addition of plasticizers in order to get better elastic properties. Such plasticizers or softeners, as for example diisooctyl phthalate are however the cause of some undesired effects. In point of fact such plasticizers are not completely locked in the spaces between the polymer chains and may be leached out by the water or aqueous solution from the polymer so that there is a contamination of the liquid stored in the bag.

It has been roughly worked out that a patient treated for some time with solutions from such bags made of flexible vinyl will take up one gram of plasticizers in his body, that is likely to be the cause of long term physiological damage to the patient.

Moreover, if made of flexible vinyl, a bag is likely to be attacked by microorganisms, that more specially will be responsible for leaching of the plasticizer and for this reason general destruction of the bag. In this respect such a bag of flexible vinyl after filling has to be safeguarded by a special outer packaging structure to keep out such microorganism.

These facts in connection with such flexible vinyl bags have made it impossible for them to take the place of glass bottles, as have been normally used to date, on any wide scale. In fact, in some industrialized countries public authorities have not allowed the use of vinyl bags for medical purposes at all.

For this reason tests were undertaken on other materials with a view to coming across one that might be used in place of flexible vinyl, but all the materials tested were overhigh in price or did not have the desired mechanical and physiological properties. For example one tested material had an overly high permeability to water vapor so that, if used, there would have been an undesired increase in the concentration of materials in a solution stored therein. Further undesired properties of the materials were the presence therein of substances that were readily leached out, or damage on rough handling of the bags.

The Swiss Pat. No. 444,382 has an account of such a plastic bag, that may be used for therapeutic liquids for parenteral administration. The wall of this plastic bag is made of a resin laminate, that on the outer side, that is to say the side facing away from the liquid, has a flexible vinyl layer and on the inner side has a polyhalogen hydrocarbon synthetic resin layer. This last-named layer is free of any substances that are undesired from the pharmacological point of view and that might be leached out into the solution stored in the bag. However such polyhalogen hydrocarbons as used do have the undesired property of being high in price with respect to manufacturing and processing and furthermore of not fusing to the desired degree on making welded seams so that there is in fact still direct contact with the flexible vinyl. Such undesired direct contact is furthermore to be seen at the outlet opening structure that is normally made completely of flexible vinyl and may be joined up with further connection hose of flexible vinyl. Moreover such a throw-away or disposable bag has undesired effects on the environment inasfar as when the bag material is burned hydrogen halides, that are strong chemicals, are let off into the atmosphere.

A further bag is to be seen in the U.S. Pat. No. 4,140,162 which is made up of a resin composition with three components. These components are a polyolefin, that is by and large made up of propylene unit only, a block copolymer and if needed a plasticizer, that may as well be a polymer. As further components of the bag antioxidants may be used, that may hardly be thought of as hygienic and healthy additions.

It will be clear from the observations made herein so far on possible components that not only the components as such but furthermore the processing thereof are high in price and that a bag or recipient made of such materials is hardly likely to be in the position of taking the place of normal flexible vinyl bags, this being for reasons of price and of process engineering.

It is for this reason that the present assignee herein has made a German patent application (see German Offenlegungsschrift specification No. 3,026,974) covering a further plastic or resin composition for producing connection elements for joining vinyl hose to polyolefin bags. This plastic composition is again made up of a number of polymeric components, that from the point of view of manufacturing technology and price are not any better than the components taken into account so far. Furthermore this connection element has to be able to be welded not only to the polyolefin bag but furthermore to the flexible vinyl hose, an operation that would normally be high in price and not readily undertaken.

The special point to be kept in mind in connection with the suggestions of the prior art is that in every case a flexible vinyl connection hose is used, that by its very nature has a plasticizer and is a danger to health.

Such connection hose, that is normally welded to the flexible vinyl bags as an outlet nipple or spout, has the desired highly elastic properties necessary if the plug-on end connectors are to be kept in place and there is to be no chance of the liquid stored in the bag running out between the stopper and nipple on sterilization at about 120 degrees C. A further point is that the stopper has to be so firmly gripped in the piece of hose round it that it may only be pulled out of it using a strong pulling force.

Another point to be kept in mind is that in the food products industry flexible plastic bags have long been in use, which in some cases have had a welded on outlet spout made of the same material as the rest of the bag. Such outlet structures do however not have the highly elastic properties as noted hereinbefore and for this reason may only be sterilized if the bag as such is able to be sterilized.

GENERAL OUTLINE OF THE INVENTION

It will be seen from these observations that one purpose or object of the present invention is that of designing a bag of the sort noted, that may be sterilized by heat at a temperature of at least 100 degrees C. and has at least one highly elastic outlet nipple or spout.

A further object or purpose of the invention is that of designing a bag of the sort noted hereinbefore that may be manufactured from a commonly used, low price plastic or resin material, that after the manufacture of the bag will be in a sterile condition and may be straightway filled with a sterile liquid.

For effecting these and further purposes or objects of the invention the bag is made of a polyolefin, that has at least one outlet structure made of cross-linked copolymer of an olefin and a vinyl acetate.

The bag produced using the teachings of the invention may be made up of plastic or resin materials that are very low in price, as for example polyethylene. The film needed for manufacturing the bag may be produced by normal processes for making film or blown film, and which for those in the art are generally speaking simple and trouble-free.

Furthermore the hose, that is used for producing the pipe-like outlet structure, is made from very low-cost olefin starting materials, that are copolymerized with a certain level of vinyl acetate (VAC).

On an increase in the level of VAC it is possible to get a sharp increase in the rebound resilience, that is a measure for the elasticity of the hose. Hose structures made of polyolefin only are less good than this copolymer inasfar as they are not elastic enough and may not be joined up with different forms of connectors, such as a coupling and the like so as to give a join with a fluid-tight seal or seating effect so that they do not keep to a very important condition in connection with medical apparatus. For this reason so far flexible vinyl hose, that has these very good elasticity properties as noted, and no other material, has had to be used.

If for example a copolymer of ethylene and vinyl acetate (EVA) is used, it will be seen that although on increasing the level of VAC the rebound resilience is stepped up, there is a decrease in the melting point in the VAC range of interest to under 100 degrees C. so that, if made with such hose connection piece, such a bag would no longer be able to be sterilized.

Although it is known that hose based on VAC containing polyolefins may be stabilized thermally by cross linking and that it is even possible for their elastic properties to be stepped up, those in the art are conscious of the fact that such cross linked hose structures are not able to be welded to the base or starting polyolefin (of which the bags are made) by itself and that in fact no connection or weldment is produced between the polyolefin and the cross linked copolymer that is made up of olefin and VAC.

The surprising discovery has now been made within the framework of the present invention that a polyolefin bag and a hose (that so far has not been cross linked) made of a copolymer of olefin, more specially ethylene, and VAC may be welded together. After the cross linking of the copolymer the weld or join is still in existence, that is to say it is not damaged by the cross linking and what is more is that the end product still has the properties that the starting material had in the first place.

A fact that is to be more specially noted is that such cross linked piece of hose, that is welded into a polyethylene bag as an outlet nipple, has the good elasticity and thermal properties, which make it possible for a bag of the present invention to be sterilized at high temperatures, as for example at about 120 degrees C., and make quite certain that the hose connector piece makes a strong join so that coupling pieces fixed thereto may not be pulled off it. It is seen from this that such a sterilizable bag for medical purposes has mechanical properties that are at least equal to those of a normal flexible vinyl or PVC bag.

A further point is that the new bag is free of plasticizer, because the polyolefin materials normally used as a film material are made without the addition of any plasticizers. For this reason there is no chance of attack by microorganisms and in this connection the bag of the invention will be seen to be more hygienic in every possible respect than flexible vinyl bags as currently in use.

Polyolefins that may be used as polymers for producing the bag of the present invention may for example be polymers produced from ethylene, propylene, butylene and the like. The preferred olefin used as a starting material is ethylene, that may be substituted with one or more groups.

Possible substitutients in this respect are for example the methyl or the ethyl group, the vinyl group and halogen atoms, more specially fluorine atoms.

Ethylene that has been polymerized is more specially preferred.

More specially used examples of polyolefins are polyethylene, polypropylene, poly-n-butylene, polyisobutylene, poly-4-methylpentene-1, chlorosulfonated polyethylene, polystyrene, halogenated polyethylenes such as polyvinyl fluoride, polyvinylidene fluoride, and polyvinylidene chloride, polymethyl metacrylate and the like. The olefins used used for producing these polyolefins may furthermore by used in the form of copolymers with other vinyl compounds, as for example ethylene/-propylene plastics, poly(ethylenevinyl acetate), acrylonitrile/butadiene/styrene polymers, ethylene-propylene block polymer, styrene copolymers, copolymer containing vinylidene fluoride, and copolymers containing styrene.

Polyolefins are products of the present invention, that have been produced by the vinyl polymerization of ethylene that may be substituted if desired. These products may furthermore have additions of small amounts of further polymers, that are not, by and large, responsible for any undesired effects on, or any changes in the structure of these polyolefins. It is as an example to have small additions of ethylene compounds substituted with styrene or polyacrylonitrile. The polyolefin products so produced are looked upon as coming within the same group as the polyolefins noted hereinbefore.

In the invention the preferred polyolefin used for the bags is polyethylene, that may if desired have the additions of small amounts of vinyl acetate in the form of ethylene vinyl acetate copolymer. In such a case the level of the vinyl acetate may be up to 10% by weight.

More specially a medium to high density polyethylene (MDA and HDA) is used that normally will have been produced by low pressure polymerization. In this respect the density will be in a range of 0.91 to 0.94 and more specially will have a value of 0.935 g/cc.

Furthermore the form of polyethylene that is more specially used in the invention has a high molecular weight and a narrow molecular weight distribution range.

In every case however care is to be taken to see that such polyolefins do not have a melting or softening point under the sterilizing temperature laying generally above 110 degrees C. in order to prevent the destruction of the bag by melting of the polyolefinic material. More specially the initial softening temperature is to be over 116 degrees C. and more limitedly is to be at 120 to 124 degrees C., while the Vicat softening temperature (DIN 53,460) is to be greater than 115 degrees C.

In the case of the EVA polymer noted hereinbefore (copolymer of ethylene and vinyl acetate) there is a decrease in the melting point for every increase in the vinyl acetate level so that such products have to undergo a cross linking process, as will be detailed hereinafter, before any sterilization operation.

The permeability of the polyolefins noted to water vapor and oxygen may be responsible for trouble conditions when solvents are stored for a long time so that there may be an increase in the strength of the solution and oxygen may make its way into the solution from outside and the dissolved components may be oxidized, something that is more specially undesired in the case of amino acid solutions so that steps have to be taken for putting an end to any such transfer of oxygen.

For stopping any such transfer, a useful sealing effect may be produced by coating the said polyolefin film of the bag on its outer face with one or more layers for lowering the permeability for water vapor and oxygen, the coating material being for example a metal film or another polymer. Such an outer layer or coating may furthermore be usefully used as a general safety measure, inasfar as even if they are very carefully produced the bag films may still have pin holes, that are hard to see and may have an undesired effect on the sterility of the solution put in the bag.

A further point is that such an outer coating may make the bag very much stronger physically so that it may be dropped from a height of some meters without bursting.

Usefully the film or foil used is of such a nature that it has a higher melting point than the polymer next to the solution. Putting it differently such outer layer is not to be melted at the melting point of the inner and there is for this reason no chance of its sticking to the welding or hot sealing tool. In this respect such an outer foil or film may be thought of as a parting film on welding the inner film.

As a polymer for making such a laminated structure any of the polyolefins named hereinbefore may be used. However the preferred polymers are those that have a low permeability to water vapor and a low permeability to oxygen. Polymers coming within such a group are for example polyamides, PVC, polyvinylidene chloride, polyvinyl fluoride, polytrifluorochloroethylene, polyethylene terephthalate, polyesters and the like. Those which are more specially preferred are polyamides, polyvinylidene chloride, polyethylene terephthalat and polyesters.

A more specially used polyamide may be a polycaprolactam that may be processed and sterilized using superheated steam at a temperature of 120 to 140 degrees C. A useful effect is to be produced if this polyamide is free of stabilizing additions and in this respect has a composition meeting the needs and conditions of food products industry.

The polymeric outer and inner films are best united using a laminating adhesive, such as polyvinylidene chloride or polyurethane. Such a polyurethane adhesive may usefully be a two component adhesive, the first component being a laminating adhesive and the second component being an additive lacquer.

From the point of view of process engineering the polyolefin used as the inner film be may produced as blown film and then bonded to the coating film using one of the said laminating adhesives, in which respect polyurethane is preferred for this purpose.

If the outer film is in the form of PVC the polyolefin film used in the invention will make certain that there is no chance of the plasticizer present in the PVC diffusing through the laminating adhesive and the polyolefin film into the solution being stored in the bag.

At 85% relative humidity and a temperature of 23 degrees C. preferred laminates have a permeability to water vapor (as measured using the test noted in DIN 53,122) of less than 1. Such values are kept to by standard sheeting with a thickness of 50 to 100 and more specially 75 microns in the case of polyolefin film and 20 to 100 or more specially 30 to 70 microns in the case of polymeric laminating film, such as a polyamide.

Furthermore in the case of such a preferred laminate the permeability to oxygen is decreased and may be under a figure of 15 cc/sq m times the number of days times the pressure difference in bar.

Such films are for example marketed by Sengewald, Halle, Westfalen, under the name "Flexovac V 7144" and from the physiological point of view have been given approval by the West German Ministry of Health in Berlin and moreover by the FDA in the United States for use in connection with food products and in medicine.

As has been noted earlier, the polyolefin film next to the liquid bottled in the bag is free of plasticizer and of any other addition that might be a danger to health and more specially might make its way of diffusion into the aqueous solution. Furthermore the polyolefin film, that may if needed be covered over with an organic laminating film, is glass-clear and transparent and will have such properties after sterilization.

As a material of the outlet structure or nipple an olefin-vinyl acetate copolymer may be used. As polyolefins that may be produced from this olefin, it is possible to make use of the olefins named hereinbefore in connection with producing the bag. Such olefins have a level of vinyl acetate in the copolymer of 5 to 40 and more specially 8 to 35 or even more limitedly of 20 to 32% by weight. As made clear earlier, the melting point of polyethylene goes down with an increase in the vinyl acetate level from about 125 degrees C. to about 70 degrees C. at a VAC level of 30% by weight. It goes without saying that at a sterilization temperature greater than 100 degrees C. such a hose will be melted and for this reason would be useless. On the other hand the rebound elasticity of such hose material desired goes up with an increase in the VAC level from 35 to 55% in the case of a 30% VAC level.

Moreover such a hose-like material containing VAC may be very readily welded to the material of the bag, if the polyolefin material used therefor is generally or completely the same. The use of polyolefin materials that are generally the same for the connector piece and the bag is for this reason preferred. More specially the material used for the outlet structure is a copolymer of ethylene and vinyl acetate (EVA) with the weight ranges as noted hereinbefore, in which respect the bag material may well be polymerized ethylene or propylene compounds. A preferred combination is one of EVA as the material for the outlet structure and polyethylene as the bag material with the weight ranges given hereinbefore.

EVA is for example put on the market by HOECHST AG under the trade name of "Hostalen LD/EVA" and by ICI under the trade name of "Evatane" and "Alkathene EVA".

The production and processing of the materials for the bag may be undertaken in a way generally used in the plastics art. For example, as made clear earlier, the bags may be produced from blown film, that is cut to size and then welded at the edges. Such a bag, that is not welded together at its edges where the connection opening is to be placed, is then welded to a piece of hose of a male part having the outlet opening or opening therein, such male part being placed on a mandrel into the opened up bag. Nextly the full edge which has so far not been welded is heat sealed to the inner hose piece or male connection piece. If there is more than one hose connection piece, such welding and connection operations are naturally undertaken at the same time using customized welding tools.

Herein the wording "hose connection piece" is used in the sense of a piece of hose producing the liquid connection between the space within the bag and infusion apparatus, catheter, injection syringe or the like that is joined up with the hose connection piece. The said wording is used herein as furthermore covering an inner part, that is welded in position within the bag and has at least one outlet opening without, however, such inner part having the form of a piece of hose running out from the edge of the said bag. Such an inner part is slipped, like a piece of hose, into the edge part of the bag where the edges have so far not been welded together and then thermally united and welded to the bag.

The bags produced on these lines have generally the same properties as a flexible vinyl or PVC bag with the difference however that the connection hose made of EVA would be melted on sterilization at over about 80 degrees C. so that thermal sterilization of such a bag would not be possible. On the other hand the weldment, that is formed between the bag and the hose connection piece, is so strong that the piece of hose would only be able to be taken out by force.

In order to make it possible for the hose connection piece to be able to be sterilized, it has to be cross linked so that the melting point of the hose and its elasticity are greatly increased. By way of such cross linking processing it in fact becomes possible for the finished bag to be sterilized at temperatures of up to about 120 degrees C. and thereover. Furthermore the cross linked hose has very much better elastic properties than a flexible vinyl hose, that normally has to be heated up before it may be slipped onto certain connection elements.

A further discovery made in development of the present invention is the fact that such cross linking is not responsible for unjoining the material where it was welded, as might have seemed likely in the first place inasfar as cross linked EVA may not be welded to polyolefin material, such as polyethylene, by itself.

The cross linking operation may be undertaken in a known way of cross linking EVA. It may take place for example by using high energy radiation, as for example using accelerated electrons alpha and gamma rays with an energy of over 2.5 Mrad. More specially the operation will be undertaken using a level of 5 to 10 Mrad, the exact figure being dependent on the nature and thickness of the material to be cross linked.

The useful effect of such process step is that the bag, that has been sealed and is generally free of pyrogens, is sterilized by the high energy irradiation so that a solution that has been sterilized beforehand may be filled into the bag, that is to say it is not necessary to undertake thermal processing in an autoclave. A still further useful effect of the processing by the use of radiation is that if the polyethylene has not been completely polymerized, or if the film of which the bag is made has a small amount of EVA therein, such material may be cross linked and be given better mechanical properties so that sterilization temperatures as high as 130 degrees C. may be used.

A further possible way of causing cross linking is one using peroxides, as for example cumol peroxide or the like, that are decomposed by heating so that radicalic cross linking is started thereby. In this it is naturally necessary for the production of the EVA hose, that is normally undertaken while heated, to be combined with the production of the bag, seeing that otherwise the EVA materials would be cross linked and would then no longer be able to be welded to the polyethylene used as the material of the bag.

A further way of cross linking that is as well based on the addition and decomposition of chemical compounds makes use of silico-organic compounds, that are decomposed in a humid warm atmosphere and then have the effect of cross linking the EVA with the formation of silicon bridges. One example for this Si cross linking process is the "Sioplas process" of ICI, in which the silico-organic compound is mixed into the EVA granules and the product is extruded as the desired film or hose. In this case as well the cross linking takes some hours to some days dependent on the degree of humidity used and the temperature. In fact the cross linking operation may be undertaken in about one hour using a temperature of over 80 degrees C. and a relative humidity of 10055.

This process as well naturally makes it necessary for the film and the hose to be produced together and at the same time, this further being true for the further processing to get the bag of the invention.

Of the possible processes for undertaking cross linking, the method using high energy radiation and processing using silico-organic cross linking compounds are preferred.

A further fact to be specially noted is that any sort of cross linking process may be used if it is such that the polyolefin hose (that is not so far cross linked and has been welded to the bag material) having a certain level of VAC may be cross linked.

Further details of the invention will be seen from the account now to be given using the figures.

LIST OF THE DIFFERENT VIEWS OF THE FIGURES

FIG. 3 is a view of the opening of a hose-like connection head made of EVA.

FIG. 4 is view looking down onto part of a further working example of the invention in the form of a male part without a frangible cover.

FIG. 5 is a section taken on the line V—V of the FIG. 4.

FIG. 6 is a view looking down on a further example, that is somewhat like the example of FIG. 4.

FIG. 7 is view of part of a working example of the invention as seen from the side, to make clear the design of the casing of a hose connection head.

DETAILED ACCOUNT OF WORKING EXAMPLES OF INVENTION

Figure 1:
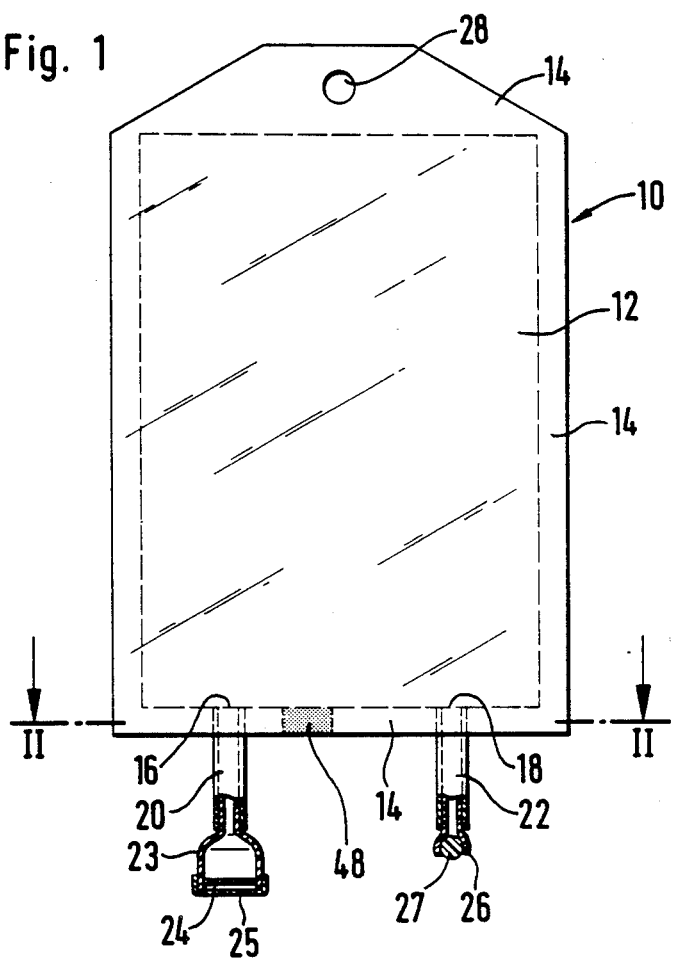
FIG. 1 is a diagrammatic view of a bag for infusion purposes, as seen looking down onto the bag.

Turning to the figures and more specially to FIG. 1, it will be seen that a bag 10 is in the form of a wall structure with an inner space 12, that has a welded edge 14 running right the way round it. The bag 10 has two outlet openings 16 and 18, that in each case are fitted with a hose connector or connection head numbered 20 in the one and 22 in the other case, such connectors forming spouts or nipples. It is by way of these connectors that the liquid to be stored, as for example an infusion solution or blood, may be run into the inner space or chamber 12 of the bag 10. In this respect, it is possible for only one of the connectors or the two of them to be used for the inlet of the liquid.

Such a bag has so far normally been manufactured by firstly placing the two cut out pieces of film together face to face and then welding them together along most of the edge 14 but not at the outlets 16 and 18. Nextly the connectors 20 and 22 are slipped into the outlets 16 and 18 using a mandrel (not figured) and they are then welded along their outer faces of the bag film. As noted earlier in this connection, the preferred material for the bag is polyethylene and the preferred material for the hose material is EVA. After being welded together the EVA material is cross linked, this being done more specially with the help of ionizing radiation.

For infusion purposes the hose connector 20 is filled up with a hollow stopper 23 designed for such infusion. This stopper has a frangible sterile diaphragm 24 that is normally made of chlorobutyl rubber and may readily be pierced by an injection needle. This diaphragm 24 is covered over with a guard thimble 25 for hygienic reasons after the diaphragm has been fixed on the stopper 23 by some known method. The stopper is normally made of polycarbonate.

The other hose connector 22 may be fitted with a syringe stopper 26 or plug, that is best made of polycarbonate material as well and has an inner part 27, made for example of latex, that is readily pierced by a hollow needle.

Once these stoppers 23 and 26 have been forced into the connectors 20 and 22 made of cross linked EVA, that are widened out somewhat, they may only be pulled out again by using a very strong force and they are in fact firmly seated and jammed in position.

In view of the fact that the bag is normally supported in use by hanging it up with the hose connectors 20 and 22 pointing downwards so that the solution in the bag may be run out from it without any trouble, the edge 14 of the bag 10, that is opposite to the hose connectors 20 and 22 has an eye 28 so that the top end of the bag 10 may be hooked onto a support part such as a stand or the like for keeping the bag in the desired position where it is used.

Figure 2:
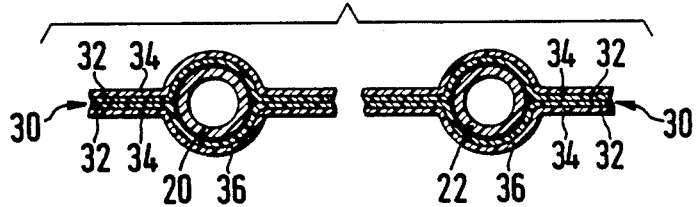
FIG. 2 is a section taken on the line II—II of the FIG. 1.

As part of the preferred working example of the invention, that is to be seen on a greater scale in FIG. 2, the material of the bag 10 is a laminate 30 made up of film sandwiched together. In line with one more specially preferred teaching of the present invention, this laminate has on its side next to the solution a layer of polyethylene film 34, that will normally have a thickness of 30 to 100 microns and more specially 75 microns. The preferred polyethylene material has a density of 0.935 g/cc, a melting range of 121 to 124 degrees C. and a Vicat softening temperature of roughly 118 degrees C.

On this polyethylene film 32 a polyamide film 34 is bonded using a polyurthane adhesive, such film 34 having a thickness in the range of about 30 to 70 microns.

From FIG. 2 it will furthermore be clear that near the joins with the hose connectors 20 and 22 the polyethylene film 32 has a welded seam 36 forming a strong and homogeneous bond between the foil and the connectors 20 and 22 so that there is not the least danger of the connectors being pulled out of the bag 10 without serious damage to bag 10 generally.

A further working example of the hose connectors 20 and 22 will be seen in FIG. 3 in which only the end parts are viewed, that is to say without seeing the weld part forming a join with the bag material. The end part 38 of the hose connectors 20 and 22 has, near the end 40 that is pushed into the bag, a diaphragm 42 running across the end 40 and shutting off the inside of the bag completely from the outside. This diaphragm 42 is pierced open, when the bag is used, by the point of an infusion apparatus that is not figured, to let off liquid from the bag 10. Because as noted the bag will normally be hanging upside down when used, it is necessary to have a seal between the point part of the infusion apparatus and the wall of the hose as otherwise there would be a danger of the liquid running out freely. To this end the inner face of the hose near the opening 40 has a ring-like bead 44 designed to be pressed against the point before piercing the diaphragm 42.

Such hose connectors 20 and 22 having a diaphragm 42 will be produced by a known injection molding process before being welded to the bag 10. A mandrel, specially designed so that the diaphragm 42 will not be pierced thereby, is used for slipping the connectors 20 and 22 into the outlet openings 16 and 18.

Because, after being sterilized in an autoclave, the diaphragm 42 is to be kept in a sterile condition, the opening 40 is covered over with a skin 46 that may be peeled off when this is desired.

The form of the invention to be seen in FIG. 3 naturally has to have a filling opening 48 at the edge of the bag 10, such opening being shaped in FIG. 1 and not being welded over when the rest of the edge of the bag is welded, as was the case with the outlet openings 16 and 18. The opening 48 makes it possible for the bag 10 to be filled and after filling has taken place is is shut by welding or hot sealed in a normal way.

A still further working example of the invention is to be seen in FIGS. 4 and 5 that has a plug piece 50 that is generally made up of the plug body 52 that has two convex sides (FIG. 4). Such a form makes it simpler for the welding to the inner film 32 to be undertaken at the edges to get a more or less completely smooth join between the welded edge 14 and the inner plug body 52.

This plug body 52 as figured will be seen from FIGS. 4 and 5 to have inlet and outlet openings 54 and 56. Furthermore it has a filling opening 58 on which some observations are to be made hereinafter.

The inlet and outlet openings 54 and 56 are each joined up with a hose-like connector 60 and 62 or headpiece. Such connectors may be of the same design as in the working examples of the invention to be seen in FIGS. 1 and 3. In fact the connectors may again have diaphragms 64 and ring-like beads 66, such a system then making the filling opening 58 necessary, that may be safely stoppered with a plug of the right form after filling has taken place.

In the working example of the invention to be seen in FIG. 5 the edges of the connectors 60 and 62 are in each case joined up by way of lines of weakness 68 with a tear-off cover 70, that on the one hand keeps the diaphragm sterile till the time of use and on the other hand is so designed that it may be readily torn off before such use.

It is naturally possible for the example of the invention of FIGS. 4 and 5 to be designed without diaphragms 64, the tear-off cover 70 and the beads 66, this making the filling opening unecessary. It furthermore goes without saying that it is possible to have one or more connectors 60 or 62.

FIG. 6 is a view of a further form of such an inner or male part 72 forming part of the present invention. It is generally in the form of a male body 74 that is convex on its two opposite sides so that its form is by and large the same as that of the male body 52. The thickness of these male bodies 52 and 74 is such in this respect that thickness-wise they are lined up with the welded edge 14 so that there are no outwardly running parts of the bodies 52 and 74.

In the case of the inner or male body 74 to be seen in FIG. 6 there are for this reason no hose-like connectors 60 and 62; that is to say the male body 74 only has two inlet and outlet openings 76 and 78 running through it from end to end. In these holes it is then possible for the stoppers 23 or 26 of figure 1 to be placed to give a further useful effect. On the other hand it is naturally possible for the inlet and outlet openings 76 and 78 to be shut off in the same way as in the example of FIG. 3, that is to say using a diaphragm 80, that is best placed on the lower surface of the male body 74. In such a case there will again be a filling opening 82, that is marked in broken lines in FIG. 6. This filling opening 82 may again be shut off using a stopper of the right size. The inlet and outlet openings 76 and 78 may, if a diaphragm 80 is used, be covered over with a piece of skin or diaphragm that may be peeled off, to keep the inlet and outlet openings 76 and 78 sterile, such skin being placed over the male body 74.

FIG. 7 is a section view of a further working example of the present invention which is designed on generally the same lines as the example of FIG. 1, only a hose-like connector 84 being seen here, that has been welded into the bag 10 at the at the edge thereof 14.

The section of FIG. 7 as part of the bag 10 is generally on the same lines as the part of the bag 10 to be seen in FIG. 1, with the difference however that at the connectors 84 there are two fold-like parts 86 placed on top of each other. When their edges have been welded together at 88, 90 and 92 they are completely and liquid tightly placed round the connector 84. The last-named is in this form of the invention again covered over with a diaphragm 94 and there is a bead 96 with a form and function as noted hereinbefore. It keeps this part of the system sterile by sealing it off from the outside.

In this respect the edge 14 is at first only welded as far as the part 98 on producing the bag 10 so that the part 86 that is produced by the two folds of film, is kept open and the connector 84 may be slipped thereinto at the weldment 14. That is to say, this edge weldment 14 is made right round the bag 10 so that the bag is sealed off. The part that is still open at edges 88, 90 and 92 is then shut off at such edges as will be seen in FIG. 7, the inner space 100 of this part 86 however being kept unwelded.

A useful effect is produced if at the join or transition between the inner space 100 and the edge 92 a line of weakness 102 is produced, that may be torn open on pulling the edge 92, that is best made so that it may readily be gripped for tearing it off completely.

It is naturally possible to have more than one connector 84 nested within one part 86 or however it is furthermore possible for more than one part 86 to be placed round one connector 84. To take an example of this, in the example of the invention of FIG. 1 it would be possible to have two connectors and two separate parts 86 and one filling opening 48, that would not be covered by such parts. On the other hand all the three openings towards the bag may be completely covered by this part, the sort of weld produced being dependent on if the connectors are covered over a diaphragm or a hollow stopper.

As a material for the hose connectors 20, 22 and the male parts 50 and 72 and furthermore the connector EVA is used with a VAC level of preferably 25 to 35% by weight. It may be in the form of one of the products "Hostalen", "Evatane" or "Alkathene" as noted hereinbefore.

After cross linking by irradiation with gamma ray for example or by processing using the Sioplas method, as cross linked hose connector or male part will have been produced that may be thermally sterilized at temperatures up to at least 120 degrees C., this being possible without any damage or weakening of the welded seam 36, that has been produced before the cross linking operation.

I claim:

1. A polyolefin film storage bag for storing liquids, having at least one opening of hose-like structure welded thereto, said at least one structure comprising a cross linked copolymer of 60–95% by weight of olefin and 5–40% by weight of vinyl acetate wherein the olefin of the polyolefin film storage bag and the olefin of the copolymer are selected from the group consisting of ethylene, propylene, n-butylene, isobutylene, 4-methylpentene-1, chlorosulfonated ethylene, styrene, vinyl fluoride, vinylidene fluoride, and vinylidene chloride.

2. The bag as claimed in claim 1 wherein said polyolefin is selected from the group: polyethylene, polypropylene, poly-n-butylene, polyisobutylene, poly-4-methylpentene-1, chlorosulfonated polyethylene, polystyrene, halogenated polyethylene, polymethyl metacrylate, copolymers thereof.

3. The bag as claimed in claim 2 wherein the initial softening temperature of the polyethylene is over 116 degrees C.

4. The bag as claimed in claim 3 wherein said polyethylene is in the form of a layer of film or foil and is laminated to a film selected from the group: polyamide film, polyvinylidene chloride film, polyethylene terephthalate film and polyester film and said polyethylene layer provides the inner surface of the bag.

5. The bag as claimed in claim 1 wherein said copolymer has an olefin level of 80 to 68% by weight and a vinyl acetate level of 20 to 32% by weight.

6. The bag as claimed in claim 1 wherein the hose like structures are designed to be joined with closing means selected from the group consisting of infusion stoppers and syringe stoppers.

7. The bag as claimed in claim 1 wherein the openings in said structure are closed by a pierceable diaphragm.

8. The bag according to claim 1 wherein said hose like structure comprises a hose like inlet opening and a hose like outlet opening.

9. The bag in accordance to claim 1 wherein the hose like structure comprises a solid male insert means having at least one opening therethrough for communicating between the interior and the exterior of the bag.

10. The bag as claimed in claim 7 wherein the portion of the opening outwardly of the diaphragm is closed by a closing means.

11. The bag as claimed in claim 10 wherein said closing means is selected from the group of closing means consisting of a weld and a stopper.

12. The bag as claimed in claim 7 wherein the hose like structure is provided with an internal narrowing means and said diaphragm is placed inwardly of said narrowing means.

13. The bag as is claimed in claim 11 wherein said closing means is removable.

14. The bag as is claimed in claim 1 wherein the outer ends of said openings are enclosed by portions of the edges of said bag welded around them.

15. A polyolefin storage bag for storing liquids having at least one opening of hose like structure said at least one structure comprising a previously uncross-linked copolymer of 60–95% by weight of olefin and 5—40% by weight of vinyl acetate first welded to said bag and then cross-linked wherein the olefin of the polyolefin film storage bag and the olefin of the copolymer are selected from the group consisting of ethylene, propylene, n-butylene, isobutylene, 4-methylpentene-1, chlorosulfonated ethylene, styrene, vinyl fluoride, vinylidene fluoride, and vinylidene chloride.

16. The bag as claimed in claim 15 wherein the cross linking has been undertaken with high energy radiation.

17. A polyethylene film storage bag for storing liquids having at least one opening of hose like structure welded thereto, said at least one structure comprising a radiation cross-linked copolymer of 60 to 95% by weight of polyethylene and 5 to 40% by weight of vinyl acetate.

18. A polyethylene storage bag for storing liquids having at least one opening of hose-like structure, said at least one structure comprising a previously uncross-linked copolymer of 60 to 95% by weight of polyethylene and 5 to 40% by weight of vinyl acetate first welded to said bag and then cross-linked by high energy radiation to provide a sterilizeable ethylene vinyl acetate hose-like structure.

19. A laminar film storage bag comprising a laminate of polyethylene on the inner side and polyamide on the outer side for storing liquids having at least one opening of hose-like structure welded thereto, said at least one structure comprising a cross-linked copolymer of 60 to 95% by weight of polyethylene and 5 to 40% by weight of vinyl acetate.

20. A laminar storage bag comprising polyethylene sheet on the inner side and a polyamide sheet on the outer side for storing liquids, having at least one opening of hose-like structure, said at least one structure comprising a previously uncross-linked copolymer of 60 to 95% by weight of polyethylene and 5 to 40% by weight of vinyl acetate first welded to said bag and then cross-linked by high energy radiation to provide a sterilizeable ethylene vinyl acetate hose-like structure.

* * * * *